(12) United States Patent
Wang et al.

(10) Patent No.: US 11,818,818 B2
(45) Date of Patent: Nov. 14, 2023

(54) DUMMY LOAD FOR AUTOMOTIVE LED LIGHT WITH CHARGING AND DISCHARGING FUNCTION

(71) Applicant: JING CHEN TECHNOLOGY CO., LTD., Tainan (TW)

(72) Inventors: Yen-Hsiang Wang, Tainan (TW); Chin-Lung Lai, Tainan (TW)

(73) Assignee: Jing Chen Technology Co., Ltd., Tainan (TW)

(*) Notice: Subject to any disclaimer, the term of this patent is extended or adjusted under 35 U.S.C. 154(b) by 163 days.

(21) Appl. No.: 17/124,670

(22) Filed: Dec. 17, 2020

(65) Prior Publication Data

US 2022/0201819 A1    Jun. 23, 2022

(51) Int. Cl.
*H05B 45/30* (2020.01)
*H05B 45/3575* (2020.01)
*H01M 10/48* (2006.01)
*H01M 10/44* (2006.01)
*F21S 41/141* (2018.01)

(52) U.S. Cl.
CPC ........ *H05B 45/3575* (2020.01); *H01M 10/44* (2013.01); *H01M 10/488* (2013.01); *F21S 41/141* (2018.01); *H01M 2220/20* (2013.01)

(58) Field of Classification Search
CPC ...... H05B 45/38; H05B 45/50; H05B 45/325; H05B 45/345; H05B 45/375; B60Q 1/1415; B60Q 1/1423; B60Q 3/80; B60Q 11/002; B60Q 11/005
See application file for complete search history.

(56) References Cited

U.S. PATENT DOCUMENTS

| | | | | |
|---|---|---|---|---|
| 5,396,163 | A | * | 3/1995 | Nor .................... H02J 7/007182 320/159 |
| 6,275,042 | B1 | * | 8/2001 | Tsai ...................... H02J 7/0013 320/132 |
| 9,413,237 | B2 | * | 8/2016 | Teggatz ................. H05B 45/46 |
| 2010/0117538 | A1 | * | 5/2010 | Fujino ............... H02M 3/33507 315/77 |
| 2013/0241507 | A1 | * | 9/2013 | Hara ......................... G05F 1/10 323/282 |
| 2013/0307435 | A1 | * | 11/2013 | Takagimoto ............ G05F 1/468 307/9.1 |
| 2022/0039236 | A1 | * | 2/2022 | Hariharan .............. H05B 45/36 |

* cited by examiner

*Primary Examiner* — Tung X Le
(74) *Attorney, Agent, or Firm* — Rosenberg, Klein & Lee

(57) ABSTRACT

A dummy load for automotive LED lights is revealed. The dummy load includes an automotive battery and a control module which is electrically connected both a body computer and a LED light module and provided with a LED control circuit and a charge control circuit. The charge control circuit includes a signal mixer circuit receiving signals from the body computer and discharge signals of the automotive battery, a charger integrated circuit (IC) and a feedback control circuit for battery both electrically connected to the signal mixer circuit, and a battery charging circuit electrically connected to the charger IC and transmitting charge signals to the feedback control circuit for battery and the automotive battery. Thereby a conventional dummy load resistor is replaced by the automotive battery for protecting the automotive LED light from overheating, increasing product stability and recycling a part of electricity for recharge of the automotive battery.

1 Claim, 3 Drawing Sheets

DUMMY LOAD FOR AUTOMOTIVE LED LIGHT WITH CHARGING AND DISCHARGING FUNCTION

BACKGROUND OF THE INVENTION

Field of the Invention

The present invention relates to a dummy load, especially to a dummy load for automotive LED lights with charging and discharging function, which not only prevents overheating of the whole light but also increases the product stability and recycles a part of electricity for energy recharge of an automotive battery. Moreover, overall luminous efficacy is improved by the LED light. Thus the dummy load with the advantages of energy-saving, carbon reduction and improved power usage is more convenient to use.

Description of Related Art

A motor vehicle is provided with a plurality of lamps arranged at different positions. These lamps with different colors not only increase the visibility of the vehicle for allowing other drivers and pedestrians to see the vehicle's presence, positions and directions of travel but also light the roadway for the driver while driving in the dark or at night.

In early days, conventional automotive light bulbs are used as light sources in vehicles. Along with fast development and applications of light emitting diode (LED), the automotive light bulbs have been replaced with LEDs due to the features of LEDs including low power consumption, reduced electricity used, long service life, fast response time, high lighting efficiency, good shock resistance, etc.

A dummy load is used to simulate the current draw used by the conventional automotive light bulb and enable the LED light to operate properly while the conventional automotive light bulb being replaced by the LED light. Refer to FIG. 3, a block diagram showing circuit for a dummy load resistor available now is revealed. The circuit for the dummy load resistor 5 mainly includes a LED control circuit 52 which is electrically connected to a body computer (BCM) 51, a LED light module 53 and a dummy load resistor 54. When the BCM 51 allows the LED control circuit 52 to work, the LED control circuit 52 dives the LED light module 53 to light up. At the same time, the LED control circuit 52 also controls the dummy load resistor 54 to work to make the LED light work properly.

Although the above dummy load resistor can make the LED light work correctly, the dummy load resistor heats up fast and generates a lot of heat while in use. This leads to overheating issues of the automotive light, which not only cause trouble in use but also affect its service life.

Thus there is room for improvement and there is a need to provide a novel dummy load for automotive LED lights with charging and discharging function which is more convenient to use.

SUMMARY OF THE INVENTION

Therefore it is a primary object of the present invention to provide a dummy load for automotive LED lights with charging and discharging function in which conventional dummy load resistor is replaced by an automotive battery with charge and discharge characteristics not only for protecting the automotive LED light from overheating and improving product stability but also recycling a part of electricity for energy recharge of the automotive battery. The overall luminous efficacy is improved by the LED light. Thereby the advantages including energy-saving, carbon reduction and improved power usage are achieved and the present dummy load for automotive LED lights is more practical to use.

In order to achieve the above objects, a dummy load for automotive LED lights with charging and discharging function according to the present invention includes a control module which is built with a LED control circuit and a charge control circuit therein and an automotive battery. The control module is electrically connected to a body computer and a LED light module while the charge control circuit is electrically connected to the automotive battery.

As to the charge control circuit, it is composed of a signal mixer circuit, a charger integrated circuit, a feedback control circuit for battery, and a battery charging circuit. The signal mixer circuit which receives signals from the body computer and discharge signals of the automotive battery at the same time is electrically connected to both the charger integrated circuit and the feedback control circuit for battery while the feedback control circuit for battery receives charge signals of the automotive battery. The charger integrated circuit is electrically connected to the battery charging circuit for allowing the battery charging circuit to transmit charge signals to both the feedback control circuit for battery and the automotive battery.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content and functions of the present invention more completely and clearly, please refer to the following embodiments with detailed descriptions with reference to the related figures and numbers therein.

Figure 1:
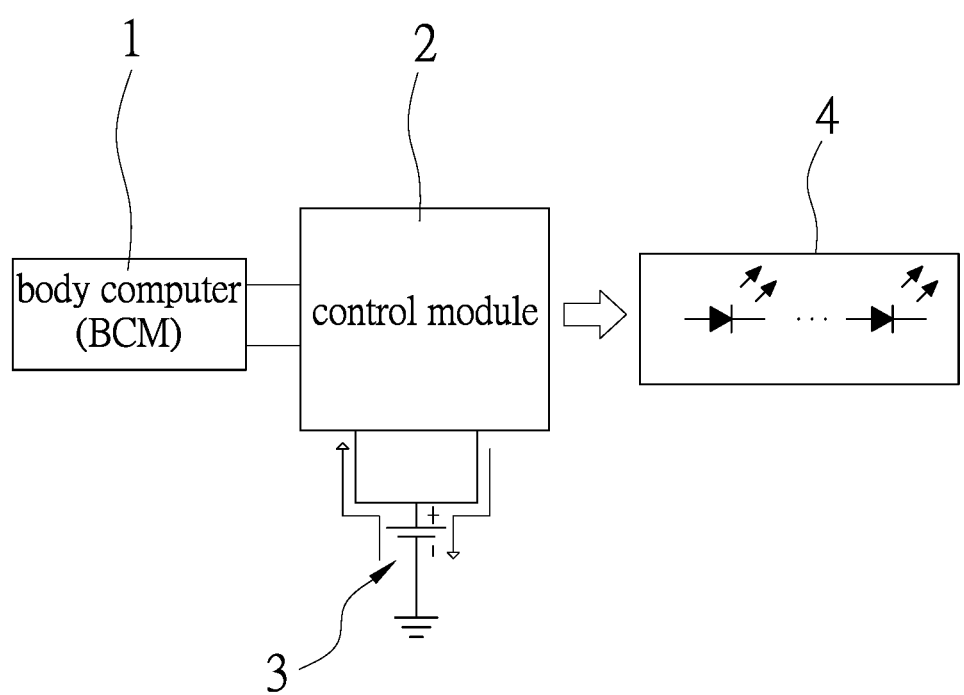
FIG. 1 is a block diagram of a circuit for an embodiment according to the present invention.
Figure 2:
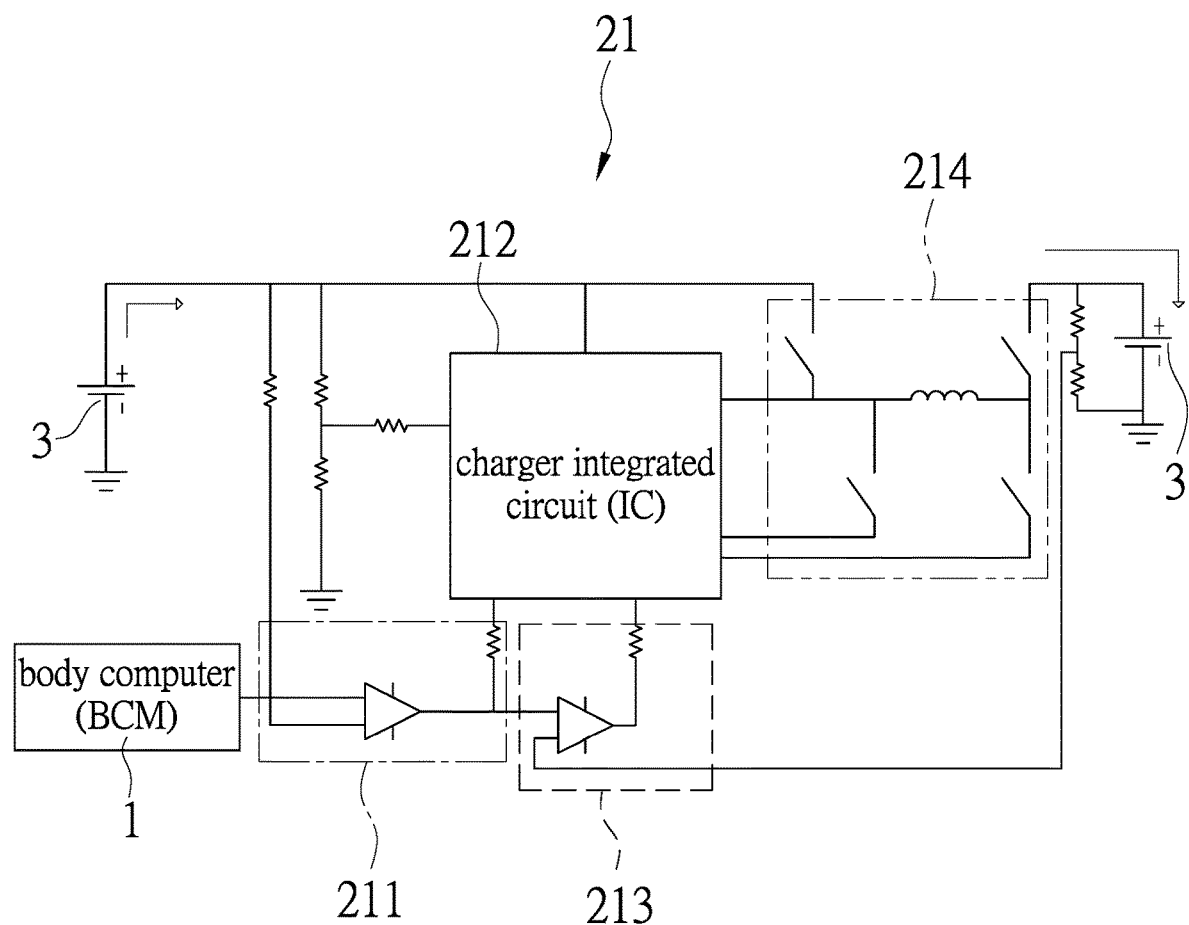
FIG. 2 is a circuit diagram of a charge control circuit of an embodiment according to the present invention.
Figure 3:
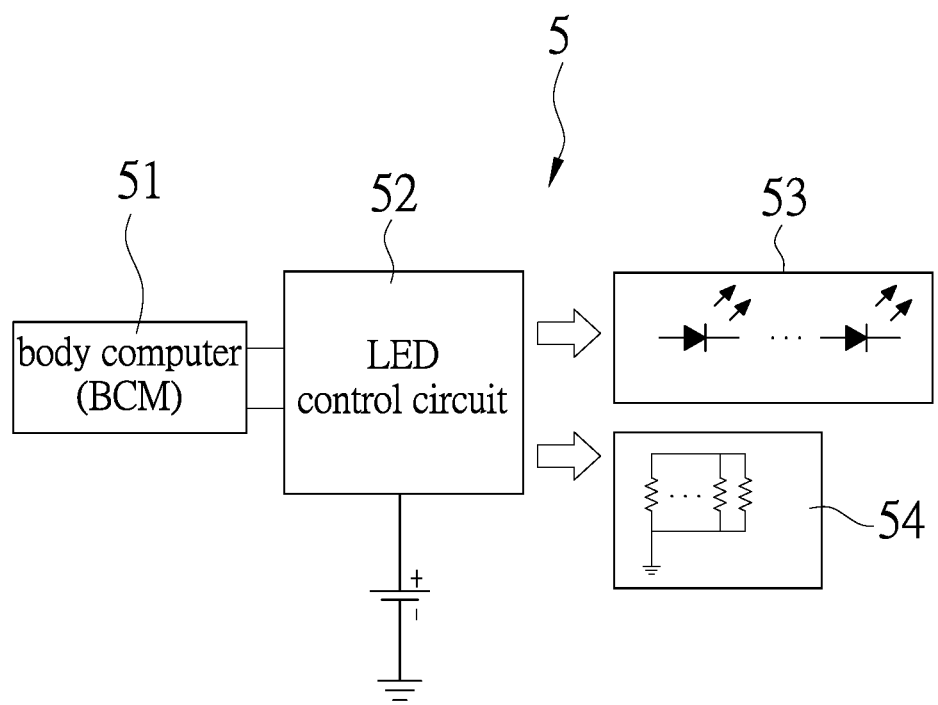
FIG. 3 is a block diagram showing a circuit for a dummy load resistor available now.

Refer to FIG. 1 and FIG. 2, a dummy load for automotive LED lights with charging and discharging function according to the present invention mainly includes a control module 2 which is electrically connected to a body computer 1 and a LED light module 4 and is built with a LED control circuit (not shown in figure) and a charge control circuit 21 therein, and an automotive battery 3 electrically connected to the charge control circuit 21.

As shown in FIG. 2, the charge control circuit 21 consists of a signal mixer circuit 211, a charger integrated circuit (IC) 212, a feedback control circuit for battery 213, and a battery charging circuit 214. The signal mixer circuit 211 which receives signals from the body computer 1 and discharge signals of the automotive battery 3 at the same time is electrically connected to both the charger IC 212 and the feedback control circuit for battery 213 while the feedback control circuit for battery 213 receives charge signals of the automotive battery 3. As to the charger IC 212, it is electrically connected to the battery charging circuit 214 for allowing the battery charging circuit 214 to transmit charge signals to the feedback control circuit for battery 213 and the automotive battery 3.

While in use, the control module 2 is actuated by the body computer 1 so that the LED control circuit of the control module 2 outputs a constant current to the LED light module 4 for allowing the LED light module 4 to light up. At the same time, the control module 2 receives control signals from the body computer 1 and retrieves small signals thereof. After being analyzed by the signal mixer circuit 211 of the charge control circuit 21, the small signals of the control signals are output to the battery charging circuit 214 and this is source-level processing of the control signals. By characteristics of the automotive battery 3, the battery charging circuit 214 outputs charge feedback signals to the feedback control circuit for battery 213 for providing optimum charging. The control signal and the charge feedback signal from the output end are compared and amplified by the battery charging circuit 214 so that charging current the battery charging circuit 214 applies is controlled by the amplified signal. A power source for the control module 2 is the automotive battery 3 and a part of electricity is sent to the automotive battery 3 to recharge the automotive battery 3 since the respective components are not ideal. Thus the automotive battery 3 is protected from over-charge or over-discharge.

In summary, compared with the techniques available now, the present invention mainly uses the automobile battery with charge/discharge characteristics to replace the conventional dummy load resistor for protecting the whole LED light from overheating and increasing product stability. A part of electricity is also recycled for energy recharge of the automotive battery. Moreover, overall luminous efficacy is improved by the LED light. Therefore the present device which has the advantages of energy-saving, carbon reduction and improved power usage is more convenient to use.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A dummy load replacement for automotive LED lights with charging and discharging functions, comprising:

an automotive battery, a control module which is electrically connected to a body computer and the automotive battery, and an LED light module, the control module being provided with an LED control circuit and a charge control circuit built therein, the LED control circuit being coupled to the charge control circuit to provide an LED operating current back to the automotive battery as a charging current therefore;

the automotive battery being electrically connected to the charge control circuit;

wherein the charge control circuit includes a charger integrated circuit, a battery charging circuit, and a signal mixer circuit, the signal mixer circuit having a first input coupled to the automotive battery, a second input coupled to the body computer, and an output coupled to an input of the charger integrated circuit, the charge control circuit further includes a feedback control circuit having a first input coupled to the automotive battery, a second input coupled to the output of the signal mixer circuit and an output coupled to another input of the charger integrated circuit, and the charger integrated circuit being connected to the battery charging circuit; wherein the battery charging circuit transmits a signal of the LED operating current back to the automotive battery as a charging signal.

* * * * *